Figure 1:
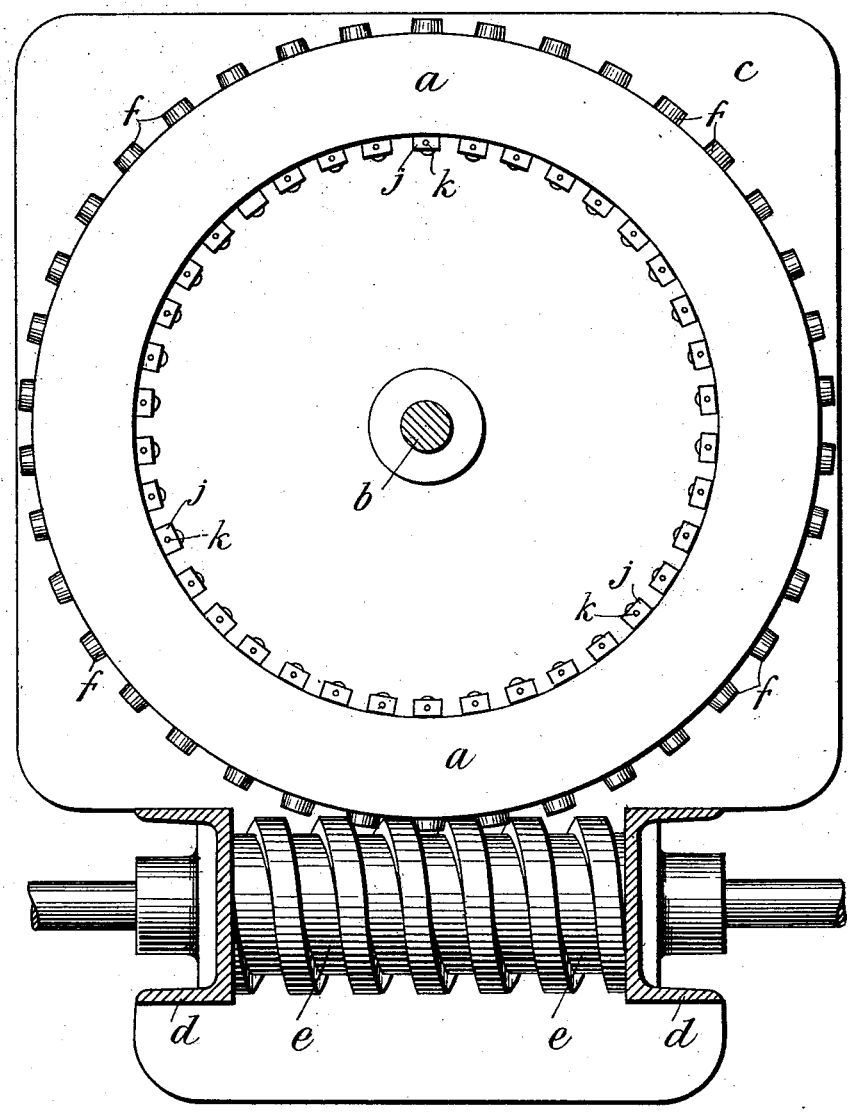

No. 715,973. Patented Dec. 16, 1902.
J. B. BUTLER.
ANTIFRICTION GEARING.
(Application filed Aug. 21, 1902.)

(No Model.) 4 Sheets—Sheet 1.

No. 715,973. Patented Dec. 16, 1902.
J. B. BUTLER.
ANTIFRICTION GEARING.
(Application filed Aug. 21 1902.)
(No Model.) 4 Sheets—Sheet 2.
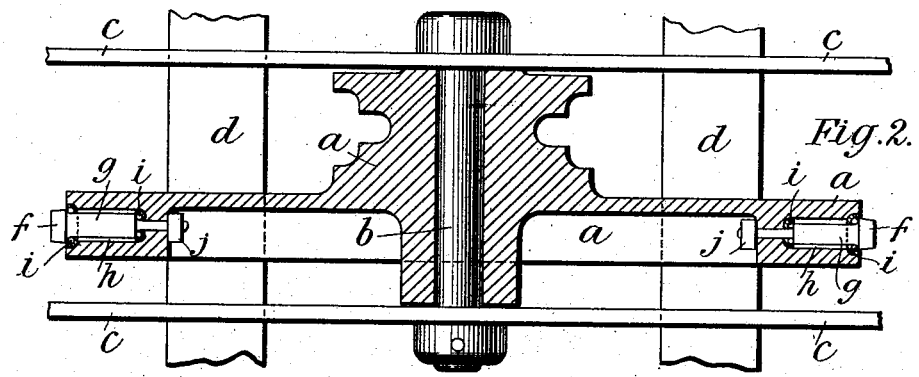
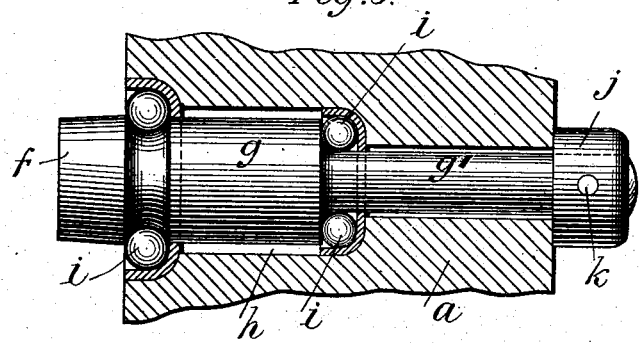
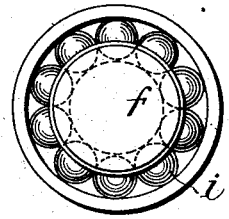
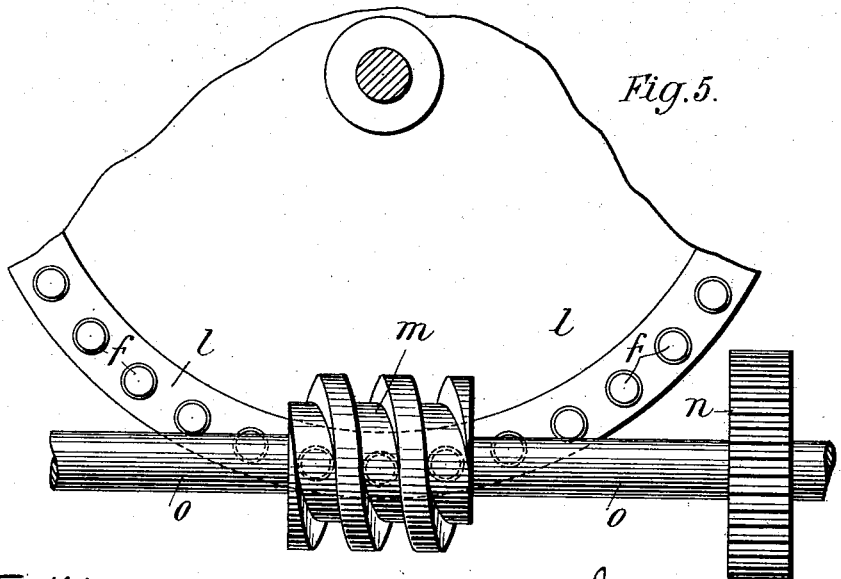

No. 715,973. Patented Dec. 16, 1902.
J. B. BUTLER.
ANTIFRICTION GEARING.
(Application filed Aug. 21, 1902.)
(No Model.) 4 Sheets—Sheet 3.
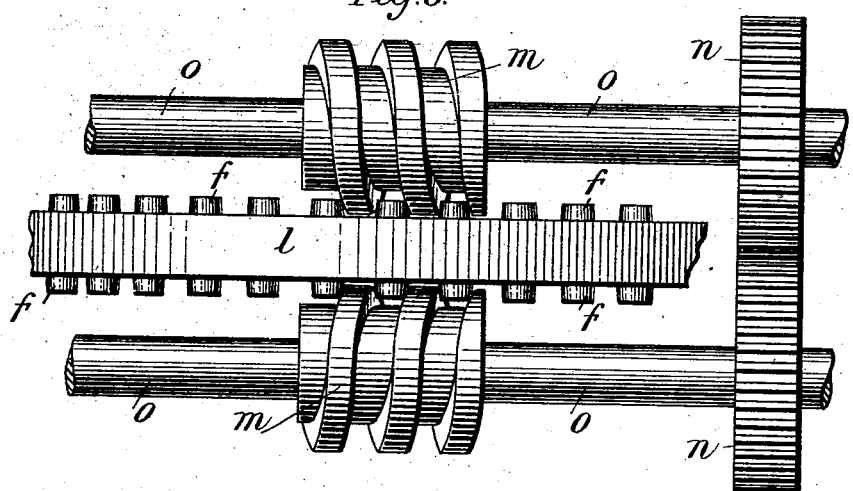
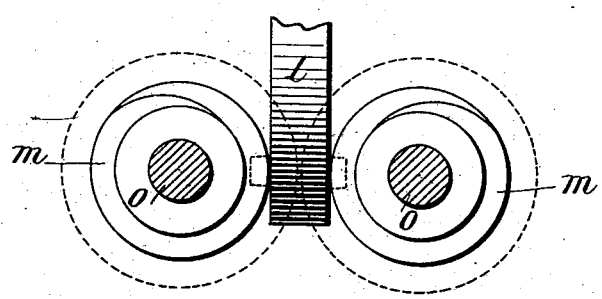
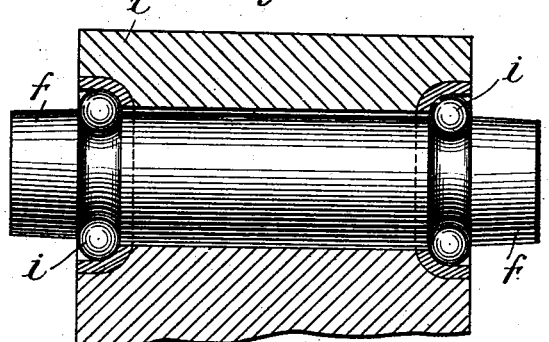
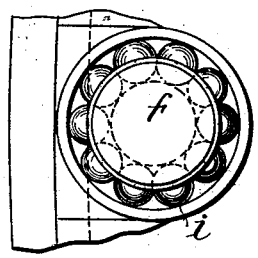

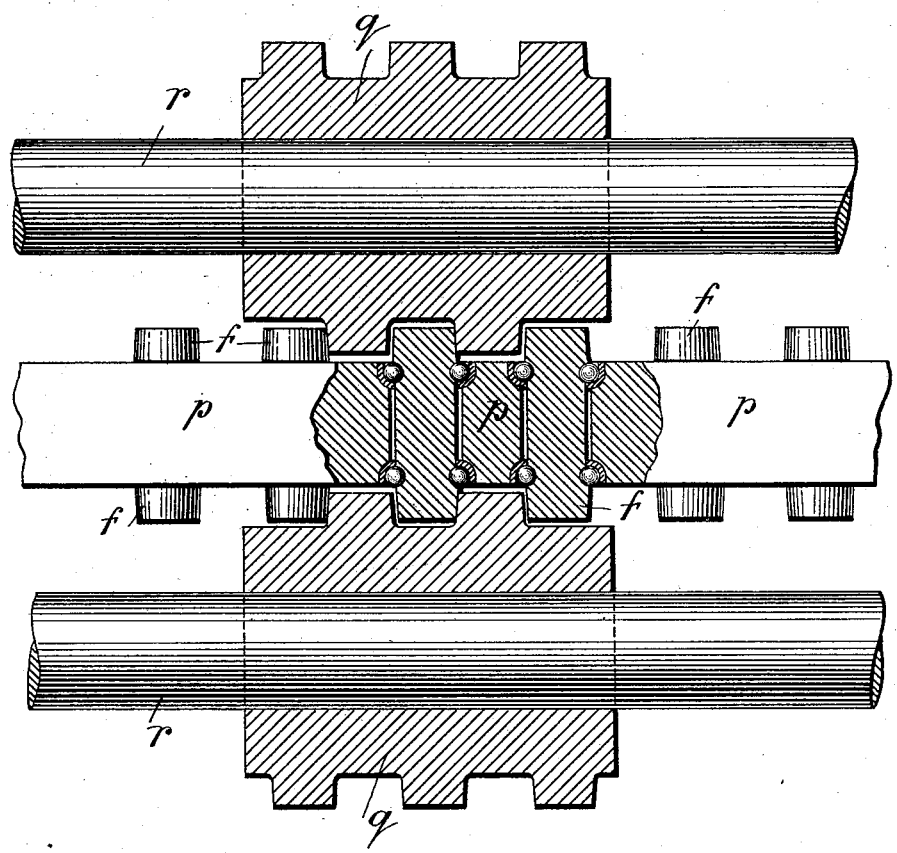

UNITED STATES PATENT OFFICE.

JOSEPH BEAUMONT BUTLER, OF BRISTOL, ENGLAND.

ANTIFRICTION-GEARING.

SPECIFICATION forming part of Letters Patent No. 715,973, dated December 16, 1902.

Application filed August 21, 1902. Serial No. 120,540. (No model.)

*To all whom it may concern:*

Be it known that I, JOSEPH BEAUMONT BUTLER, a subject of the King of Great Britain, residing at Bristol, England, have invented certain new and useful Improvements in Antifriction-Gearing; and I do hereby declare the following to be a full, clear, and exact description of the invention, such as will enable others skilled in the art to which it appertains to make and use the same.

My invention relates to improvements in teeth for worm-wheels, racks, and the like, and has for its object to provide a revoluble antifriction - tooth adapted to be radially mounted on the periphery of the worm-wheel or parallel with the axis of the wheel or similarly located on the face of the rack.

Further details and objects of my invention will be apparent upon reference to the accompanying drawings, illustrating my invention, in which like letters refer to like parts in the several views, and in which—

Figure 1 is an elevation of a worm-wheel provided with teeth in accordance with my invention. Fig. 2 is a horizontal sectional view. Fig. 3 is a detail view, partly in section, showing the revoluble tooth illustrated in Fig. 1, on an enlarged scale, and the manner of mounting the same. Fig. 4 is an end view of the same. Fig. 5 is an elevation showing a modified arrangement of the teeth in the worm-wheel. Fig. 6 is a plan view, and Fig. 7 is an end view of the same. Fig. 8 is a detail view, partly in section, showing the modified form of tooth, on an enlarged scale, illustrated in Figs. 5 to 7. Fig. 9 is an end view of the same, and Fig. 10 shows the application to a rack of the modified form of teeth illustrated in Figs. 5 to 9.

In carrying out my invention the worm-wheel $a$ is illustrated as mounted on a shaft $b$, secured in the frame $c$, having brackets $d$, in which is journaled the worm $e$. The teeth comprise the elongated shank or spindle $g$, adapted to be revolubly mounted in sockets or apertures $h$ in the wheel rim or rack, as the case may be, and these spindles are provided with the circumferential beveled end $f$, formed integrally therewith. The spindles or shanks $g$ are preferably provided with circumferentially-disposed ball-runways adapted to be located opposite similar runways in the apertures $h$ when the teeth are fitted in place in the wheel or rack, and suitable balls $i$ are provided in the said runways for forming a ball-bearing for the teeth.

In the construction shown in Figs. 1 to 4 the inner end of the spindle $g$ is cut away, as at $g'$, and on the end of this cut-away portion is placed a collar $j$, secured by a pin $k$, passing through it and the spindle for retaining the tooth in place on the wheel; but it is obvious that the teeth may be held in position in any other suitable way. For instance, the end of the reduced portion $g'$ of the spindle may be screw-threaded and instead of collar $j$ a nut provided.

In the construction shown in Figs. 5 to 10 the teeth $f$ are illustrated as having each end circumferentially beveled, forming a double-headed tooth. This construction is used where the teeth are adapted to be disposed transversely in the rim of the wheel $l$ with their axes parallel with the axis of the wheel-shaft, and the teeth are acted upon at each end by twin worms $m$, operated by the pinions $n$, mounted on the worm-shafts $o$. This side driving arrangement tends to equalize the strain on the teeth.

In the application of my invention to a rack the teeth may be of the form and fitted in the rack in the manner similar to that shown in Figs. 1 to 5, or, as illustrated in Fig. 10 of the drawings, the rack $p$ may be provided with the double-headed teeth and side driving mechanism illustrated in Figs. 5 to 9, the teeth-spindles extending through the rack $p$ and provided with ball-bearings $i$, as shown, and gearing with the worms $q$, centered on the shafts $r$, driven at the same rate of speed.

It is apparent that my invention provides a means for reducing the friction, and hence the grinding effect upon the bearing-surface, by rotation of the teeth about their axes as the worm-wheel is rotated or when the worm is moved along the rack in cases where my invention is applied to a rack.

Having thus fully described my invention, what I claim, and desire to secure by Letters Patent of the United States, is—

1. A revoluble tooth for worm wheels or racks, having an elongated cylindrical spindle or shank and a circumferentially-beveled tip formed integrally therewith, and circular grooves cut in said cylindrical spindle or shank and lying below the surface thereof for forming ball-runways.

2. A revoluble tooth for worm wheels or racks, comprising an elongated cylindrical spindle or shank having a circumferentially-beveled tip at each end thereof and formed integrally therewith.

3. A revoluble tooth for worm wheels or racks, comprising an elongated cylindrical spindle or shaft having a circumferentially-beveled tip at each end thereof and formed integrally therewith and runways cut in said shank for forming ball-bearing surfaces.

4. The combination with a worm wheel or rack having a plurality of apertures therethrough provided with suitable ball-bearing surfaces, of teeth revolubly mounted therein, each of said teeth comprising an elongated shank or spindle having a circumferentially-beveled tip at each end thereof and formed integrally therewith, runways cut in said shank immediately adjacent said beveled tips, and balls located in said runways for forming a ball-bearing for said teeth.

5. The combination with a worm wheel or rack having a plurality of apertures therethrough, provided with suitable ball-bearing surfaces, of teeth revolubly mounted therein, each of said teeth comprising an elongated shank or spindle having a circumferentially-beveled tip formed integrally therewith, circular grooves cut in said cylindrical spindle or shank and lying below the surface thereof, balls operating in said circular grooves for forming a ball-bearing for said teeth, and means for retaining said teeth in said apertures.

In testimony whereof I affix my signature in presence of two witnesses.

JOSEPH BEAUMONT BUTLER.

Witnesses:
JOHN ROBERTSON OWEN,
ANDREW WOOD WILKINSON.